(12) United States Patent
Newmann et al.

(10) Patent No.: US 6,418,916 B1
(45) Date of Patent: Jul. 16, 2002

(54) TREATMENT OF ENGINE BLOW-BY GASES

(75) Inventors: Ramon Newmann, North Perth; David Richard Worth, Shenton Park, both of (AU)

(73) Assignee: Orbital Engine Company (Australia) Pty. Limited, Balcatta (AU)

( * ) Notice: Subject to any disclaimer, the term of this patent is extended or adjusted under 35 U.S.C. 154(b) by 0 days.

(21) Appl. No.: 09/555,526

(22) PCT Filed: Feb. 22, 1999

(86) PCT No.: PCT/AU99/00102

§ 371 (c)(1),
(2), (4) Date: Jun. 9, 2000

(87) PCT Pub. No.: WO99/42711

PCT Pub. Date: Aug. 26, 1999

(30) Foreign Application Priority Data

Feb. 20, 1998 (AU) ............................................. PP 1916

(51) Int. Cl.[7] .............................................. F01M 13/04
(52) U.S. Cl. ..................................... 123/572; 123/559.1
(58) Field of Search ................................ 123/572, 573, 123/574, 41.86, 559.1

(56) References Cited

U.S. PATENT DOCUMENTS

| | | | |
|---|---|---|---|
| 3,859,971 A | * 1/1975 | Rauen | 123/572 |
| 4,453,502 A | * 6/1984 | Resler, Jr. | 123/574 |
| 5,123,385 A | * 6/1992 | Sado et al. | 123/572 |
| 5,499,604 A | 3/1996 | Ito et al. | 123/41.86 |
| 5,499,616 A | * 3/1996 | Enright | 123/572 |
| 5,669,366 A | 9/1997 | Beach et al. | 123/572 |
| 5,899,197 A | * 5/1999 | Watanabe et al. | 123/572 |

\* cited by examiner

*Primary Examiner*—Marguerite McMahon
(74) *Attorney, Agent, or Firm*—Arent, Fox, Kintner, Plotkin & Kahn, PLLC

(57) ABSTRACT

A method and system of treating blow-by gases within an internal combustion engine, the engine (10) including at least one combustion chamber (28), a dual fluid fuel injection system (26) for delivering a metered quantity of fuel entrained in compressed gas to the at least one combustion chamber (28), the injection system (26) having a compressor (38) for supplying the compressed gas, the method including using the intake vacuum of the compressor to draw the blow-by gases from within the engine for subsequent delivery by the injection system to the at least one combustion chamber.

18 Claims, 1 Drawing Sheet

TREATMENT OF ENGINE BLOW-BY GASES

Figure 1:
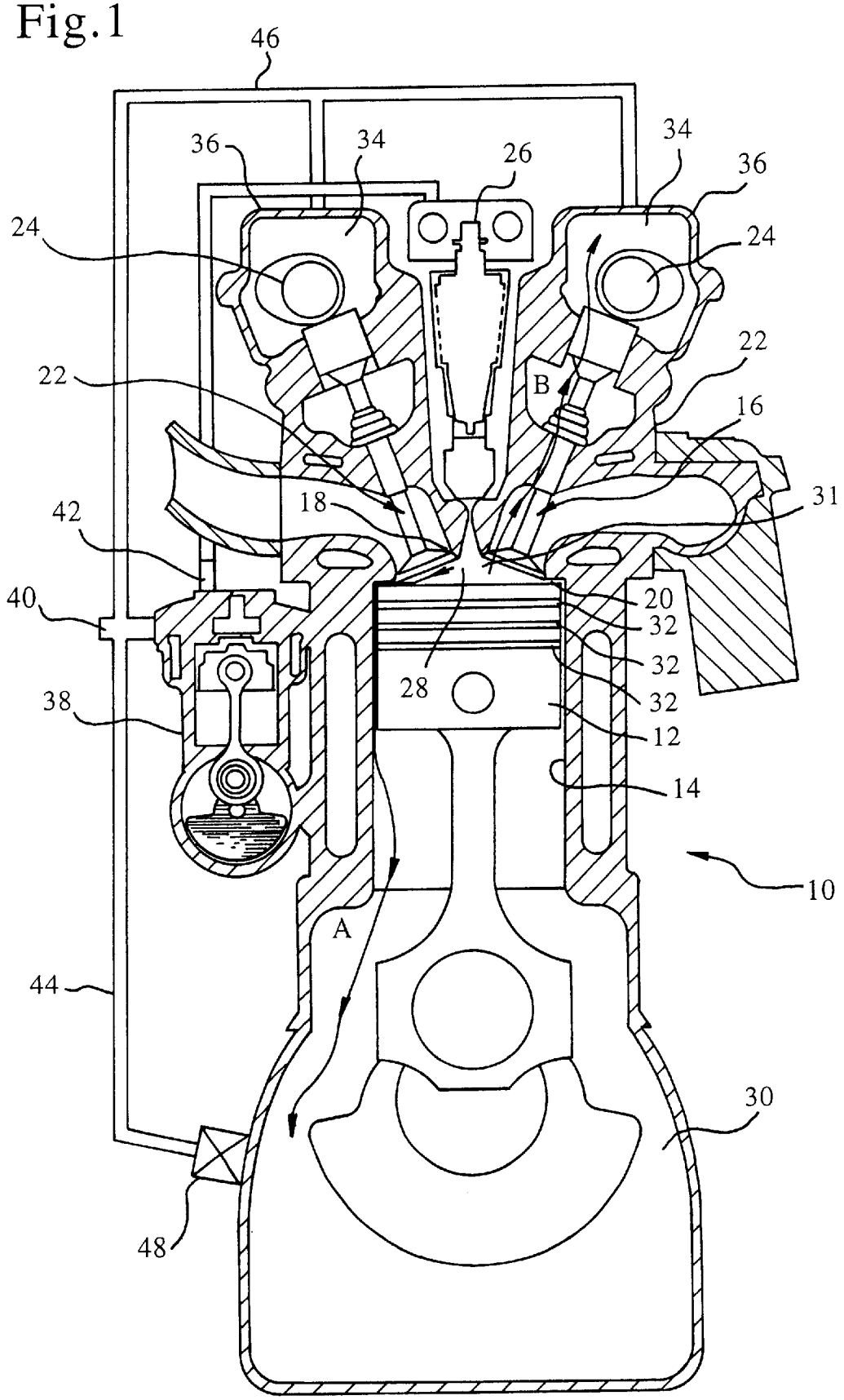

The present invention relates to internal combustion engines and particularly to the treatment of blow-by gases in such engines.

Blow-by in internal combustion engines is the unwanted leakage of gas under pressure such as is known to occur past a piston and/or its sealing rings into the crankcase of the engine. The phenomenon generally results from the production of very high pressure conditions within the combustion chamber of the engine just after ignition which may cause typically small quantities of gas to leak through areas where an imperfect fluid seal may exist. Accordingly, as well as leakage into the crankcase of an engine, blow-by may also occur past intake or exhaust valves and injection elements located in the engine cylinder head or upper sections of the cylinder wall and into the volume beneath a cam or rocker cover of the engine.

Different emission control systems for dealing with such blow-by gases in order that they are prevented from entering the atmosphere are well known. The most common typically include a positive crankcase ventilation or PCV valve which enables blow-by gases in the crankcase to be drawn therefrom. Typically, such blow-by gases are fed to an appropriate location within the engine's induction system, such as for example, a point upstream of the individual runners or air tracts which duct air to each cylinder. Such systems rely on the vacuum present in the induction system upstream of the engine cylinders to draw the blow-by gases from the crankcase and into the induction system. The blow-by gases are subsequently delivered by the induction system back into the combustion chambers of the engine for burning, together with the fresh air charge required for subsequent combustion events.

Further, in respect of the blow-by gases which may be present in the volume beneath any cam and/or rocker cover of the engine, it is know to provide a simple conduit communicating the volume beneath the cam or rocker cover with the engine induction system. In a similar manner, the vacuum generated in the induction system is used to draw any blow-by gases present in such volumes through the conduit and into the induction system such that they can be delivered to the engine combustion chambers.

In U.S. Pat. No. 5,669,366 (Beach et al), there is described a closed crankcase ventilation system for recycling blow-by gas that has accumulated within the engine crankcase. The engine includes a turbocharger, and the system relies on suction generated from a vacuum assist from the turbocharger inlet to draw blow-by gases from the crankcase. The blow-by gases are then delivered to the engine induction system for subsequent combustion within the engine combustion chambers.

Whilst the above mentioned prior art systems provide a simple way for treating any blow-by gases that may exist within certain parts of the engine, it has been found that under some circumstances, and in particular relation to certain engine applications, that they may not always satisfactorily deal with such blow-by gases. In particular, in certain engine applications, the level of vacuum which is present in the induction system under idle and low load conditions may not be enough to effectively draw any blow-by gases from their location within the engine into the induction system for subsequent delivery into the engine combustion chambers for burning. This is particularly so in regard to stratified charge engines which generally operate with a significantly lower level of vacuum in the induction system. In such engines, noticeable difficulty may be experienced in regard to the treatment of blow-by gases by way of such prior art systems. Similar problems may exist in regard to conventional four-stroke manifold injection engines except that the unsatisfactory levels of vacuum in the induction system may exist at medium to high engine operating loads.

Further there is a possibility in all of the abovedescribed arrangements that not all of the blow-by gases delivered by the engine induction system are unsatisfactorily burnt. This is because as the blow-by gases are mixed and thereby diluted in the bulk air delivered by the induction system to the engine, at least some of the hydrocarbons present in the blow-by gases may be delivered away from the main ignition area within the combustion chambers. These hydrocarbons may then not be satisfactorily burnt prior to being exhausted from the engine leading to unwanted hydrocarbon exhaust emissions.

It is therefore an object of the present invention to provide a method for the treatment of engine blow-by gases and an apparatus therefor which ameliorates at least some of the problems or short-comings of the prior art.

With this in mind, the present invention provides in one aspect a method of treating blow-by gases within an internal combustion engine, the engine including at least one combustion chamber, a dual fluid injection system for delivering a metered quantity of fuel entrained in compressed gas to the at least one combustion chamber, and a compressor for supplying the compressed gas, the method including using the intake vacuum of the compressor to draw the blow-by gases from within the engine for subsequent delivery by the injection system to the at least one combustion chamber.

Preferably, the compressor supplies pressurised gas, typically air, to entrain a metered quantity of fuel for delivery directly into the at least one combustion chamber. In this way, blow-by gases drawn from the engine by the compressor may be delivered directly into the combustion chamber by way of the dual fluid fuel injection system.

Because the blow-by gases are delivered from the compressor directly into the at least one combustion chamber of the engine by the fuel injection system, such blow-by gases may be satisfactorily burnt within the combustion chamber and/or suitably treated by an exhaust system of the engine. That is, this leads to more effective combustion of the blow-by gases because the hydrocarbons are delivered in a controlled manner into the combustion chamber as part of a fuel rich fuel spray.

Conveniently, the engine includes at least one cylinder supporting a piston therein, a cylinder head and a crankcase, the cylinder and the piston together with the cylinder head defining the combustion chamber. Conveniently, a rocker or cam cover may be associated with the cylinder head in the usual manner such that the rocker or cam cover and the cylinder head together define a volume beneath the rocker or cam cover.

Preferably, the blow-by gases are drawn by the compressor from the engine crankcase. Preferably, the blow-by gases are drawn by the compressor from the volume beneath the rocker or cam cover. Conveniently, the intake vacuum of the compressor may be used to draw blow-by gases simultaneously from both the engine crankcase and the rocker or cam cover volume.

The method may be implemented as the sole method for treating blow-by gases within the engine or may alternatively be used in conjunction with other known prior art systems or methods for treating blow-by gases such as those mentioned hereinbefore. Conveniently, the method is implemented when the engine is operating at idle and/or low loads.

Preferably, the method is implemented in a stratified charge engine. Such engines typically operate with a low level of vacuum in the induction system.

According to another aspect of the present invention, there is provided a system for treating blow-by gases within an internal combustion engine, the engine including at least one combustion chamber, a dual fluid injection system for delivering a metered quantity of fuel entrained in compressed gas to the at least one combustion chamber, a compressor for supplying the compressed gas, and means connecting an intake of the compressor with a part of the engine where blow-by gases may be present such that the intake vacuum of the compressor can draw the blow-by gases from within the engine for subsequent delivery by the injection system to the at least one combustion chamber.

Preferably, the compressor supplies pressurised gas, typically air, to entrain a metered quantity of fuel for delivery directly into the at least one combustion chamber.

Conveniently, the engine includes at least one cylinder supporting a piston therein, a cylinder head and a crankcase, the cylinder and the piston together with the cylinder head defining the combustion chamber. Conveniently, a rocker or cam cover may be associated with the cylinder head in the usual manner such that the rocker or cam cover and the cylinder head together define a volume beneath the rocker or cam cover.

Preferably, the part of the engine from which the blow-by gases are drawn is an engine crankcase. Preferably, the part of the engine from which the blow-by gases are drawn is the volume beneath the rocker or cam cover.

The invention will now be described in more detail with reference to the accompanying drawing which illustrates a partially cross-sectional schematic view of a valved four stroke engine illustrating the method and system according to the present invention.

The engine 10 comprises a piston 12 mounted for reciprocation in a cylinder 14 and a cylinder head 16 including an intake port 18 and an exhaust port 20. Conventional poppet valves 22 are operatively arranged with respect to each of the ports 18 and 20 and each valve 22 is actuated by a respective camshaft 24 in the known manner. The cylinder head 16 also supports a dual fluid fuel injection system 26 which is arranged to deliver a metered quantity of fuel entrained in a gas directly into a combustion chamber 28 of the engine 10. The engine 10 also includes a crankcase 30 arranged beneath a lower level of the cylinder 14 in the known manner.

Under normal operation, the very high pressure conditions which exist in the combustion chamber 28 immediately following an ignition event may cause small quantities of combustion gas to leak past the piston 12, and specifically the piston rings 32 thereof, and enter the crankcase 30. This leakage path between the piston 12 and the crankcase 30 is illustrated by "A". Some leakage, or blow-by, may also occur past other elements which are exposed to the very high pressures in the combustion chamber 28 such as the poppet valves 22 and the dual fluid fuel injection system 26. In respect of the poppet valves 22, blow-by may occur past the support and actuation means thereof as shown by "B" and into a volume 34 beneath a cam cover 36 of the engine 10. In engines which comprise a single rocker or cam cover mounted on the cylinder head of the engine, such blow-by gases may similarly accumulate in the volume beneath the single rocker or cam cover of the engine.

An air compressor 38 is operatively arranged with respect to the engine 10 and comprises and an inlet 40 and an outlet 42. The compressor 38 may be of any suitable construction including, for example, positive displacement piston compressors or scroll-type compressors. The compressor 38 is arranged (not shown) to deliver compressed air to the dual fluid fuel injection system 26 to assist in the delivery of metered quantities of fuel into the combustion chamber 28.

To enable blow-by gases to be suitably dealt with, the inlet 40 of the compressor 38 may be communicated with each of the areas of the engine 10 within which blow-by gases may exist. As can be seen in FIG. 1, the crankcase 30 is communicated with the inlet 40 by way of a suitable conduit 44 and the volume 34 beneath the cam covers 36 is communicated with the inlet 40 by way of a suitable conduit arrangement 46. The conduit 44 may communicate with the crankcase 30 by way of a conventional PCV valve 48 as shown or in certain engine applications may be connected directly thereto. Other suitable valve means may also be used between the conduit 44 and the crankcase 30 and equally between the volumes 34 and the conduit arrangement 46.

When the compressor 38 is operational, any blow-by gases present in the crankcase 30 or the volumes 34 will be drawn therefrom by the vacuum generated within the inlet 40 of the compressor 38 and subsequently be delivered via the outlet 42 to the dual fluid fuel injection system 26. This will take place irrespective of the level of vacuum existing in the conventional air induction system of the engine (not shown). That is, the blow-by gases delivered to the combustion chamber 28 independent of the conventional air induction system of the engine. The blow-by gases are subsequently delivered into the combustion chamber 28 by the dual fluid fuel injection system 26 where they are combusted together with the normal air/fuel mixture therein in the known manner.

Due to the fact that the concentration of hydrocarbons in the crankcase 30 due to the build-up of blow-by gases can often be many times that found in the engine's exhaust gases, this method of treating the engine blow-by gases wherein they are directly injected into the combustion chamber 28 is a particularly effective way of dealing with such unwanted gases. This is because such hydrocarbons form part of the rich fuel spray that is delivered into the combustion chamber 28 in a controlled manner. Such fuel spray is typically delivered to an area within the combustion chamber such that a portion thereof is adjacent an ignition means (not shown) of the engine 10. As a result, there exists a greater likelihood that such hydrocarbons which were present in the blow-by gases will be burnt in the combustion chamber 28 as compared to if the blow-by gases were delivered into the combustion chamber 28 by way of the engine induction system. In regard to some of the prior art systems, there exists the possibility that, due to the dilution and mixing of the blow-by gases with the bulk air as they are delivered by the induction system, that the hydrocarbons present in the blow-by gases may be delivered to remote areas within the combustion chamber 28 wherein they may not be satisfactorily burnt prior to being exhausted therefrom.

Since the level of vacuum present in the inlet 40 of the compressor 38 is typically higher than that found in conventional engine induction systems upstream of the engine for a significant portion of engine operating conditions, the method of the present invention provides an effective way of drawing blow-by gases from the engine 10. This is particularly so in regard to such engines operating within the medium to high load range of operation. Further, the present invention may be more effective in engines which from time to time may operate with a highly stratified fuel distribution. Such highly stratified operation typically equates with a low level of vacuum being present in the air induction system which would generally be unsatisfactory for drawing blow-by gases from the engine for subsequent delivery back into the combustion chambers thereof, particularly at idle and low load operating conditions. In contrast, in the system according to the present invention, there is typically a reliable level of suction at the inlet 40 of the compressor 38 to draw the blow-by gases from the engine under such operating conditions.

Further, since the drawing of blow-by gases from the engine crankcase 30 and/or the volumes 34 beneath the cam or rocker cover may also result in a small quantity of oil being drawn into the compressor 38 via the inlet 40 thereof, this may have the positive effect of providing some lubrication the internal components of the compressor 38.

The method of the present invention may be used as the sole method for treating the blow-by gases which may exist in the engine 10 or may be used in combination with other known treatment methods or systems. Such prior art methods may of course include those that rely on the vacuum in the standard induction system of an engine such as crankcase ventilation systems. For example, a system may be arranged wherein, under certain operating conditions, part of the blow-by gases are drawn through the compressor 38 whilst the remainder of the blow-by gases are drawn into the air induction system of the engine 10. Equally, the method and system of the present invention may be used to draw blow-by gases from a single part of the engine 10 such as the crankcase 30 or the volume 34, or may be used to draw blow-by gases simultaneously from several parts of the engine 10.

The method and apparatus of the present invention has in the main been described with respect to a four stroke cycle engine. It is however to be appreciated that the present invention is equally applicable to both two and four stroke cycle engines having any number of cylinders or combustion chambers. In particular regard to two stroke engines and drawing blow-by gases from the engine crankcase, the present invention is more so applicable to such two stroke engines which are not crankcase scavenged (ie: wet sump engines).

Modifications and variations which may be made to the invention described herein as would be understood by one skilled in the art reading the disclosure are deemed to be within the scope of the present invention. For example, certain engine applications may provide a throttle means within the inlet 40 to the compressor 38 such that the amount of air delivered thereby is restricted according to the level of throttling applied. In such an engine, it would be preferable for the crankcase 30 and/or volume 34 to be communicated with a point downstream of the throttle means within the inlet 40 as the level of vacuum at this point would be greater than that existing upstream of the throttle means and hence provide for more effective treatment of the blow-by gases.

What is claimed is:

1. A method of treating blow-by gases within an internal combustion engine, the engine including at least one combustion chamber having a bulk air supply, a dual fluid injection system for delivering a metered quantity of fuel entrained in compressed gas to the at least one combustion chamber, and a compressor for supplying the compressed gas, the method including using an intake vacuum of the compressor to draw the blow-by gases from within the engine for subsequent delivery by the injection system to the at least one combustion chamber, the compressor supplying pressurised gas separately from the bulk air supply to entrain the metered quantity of fuel for delivery directly into the at least one combustion chamber.

2. A method according to claim 1, wherein the blow-by gases are drawn from a crankcase of the engine.

3. A method according to claim 1, wherein the blow-by gases are drawn from within a rocker or cam cover of the engine.

4. A method according to claim 1, wherein the blow-by gases are drawn from a crankcase and from within a rocker or cam cover of the engine.

5. A method according to claim 1, wherein the engine is a four stroke engine.

6. A method according to claim 1, wherein the engine is a two stroke engine.

7. A method according to claim 1 wherein the blow-by gases are delivered into the at least one combustion chamber in a vicinity of an ignition means arranged for operation therein.

8. A method according to claim 1, wherein a portion of the blow-by gases are drawn into an air induction system of the engine for subsequent delivery to the at least one combustion chamber.

9. A method according to claim 1, wherein the engine operates from time to time with a highly stratified fuel distribution.

10. A system for treating blow-by gases within an internal combustion engine, the engine including at least one combustion chamber having a bulk air supply, a dual fluid injection system for delivering a metered quantity of fuel entrained in compressed gas to the at least one combustion chamber, and a compressor for supplying the compressed gas, and means connecting an intake of the compressor with a part of the engine where the blow-by gases may be present such that an intake vacuum of the compressor draws the blow-by gases from within the engine for subsequent delivery by the injection system to the at least one combustion chamber, the compressor supplying pressurised gas separately from the bulk air supply to entrain the metered quantity of fuel for delivery directly into the at least one combustion chamber.

11. A system according to claim 10, including a conduit communicating a crankcase of the engine with an inlet of the compressor for allowing blow-by gases to be drawn therefrom.

12. A system according to claim 10, including a conduit communicating a volume within a rocker or cam cover with an inlet of the compressor for allowing blow-by gases to be drawn therefrom.

13. A system according to claim 10, including conduits respectively communicating a crankcase and a volume within a rocker and cam cover with an inlet of the compressor for allowing blow-by gases to be drawn therefrom.

14. A system according to claim 10 wherein the engine is a four stroke engine.

15. A system according to claim 10, wherein the engine is a two stroke engine.

16. A system according to claim 10, wherein the blow-by gases are delivered into the at least one combustion chamber in a vicinity of an ignition means arranged for operation therein.

17. A method according to claim 10 wherein a portion of the blow-by gases are drawn into an air induction system of the engine for subsequent delivery to the at least one combustion chamber.

18. A method according to claim 10, wherein the engine operates from time to time with a highly stratified fuel distribution.

* * * * *